United States Patent
Nakai et al.

(10) Patent No.: US 8,339,909 B2
(45) Date of Patent: Dec. 25, 2012

(54) OPTICAL DISC DEVICE

(75) Inventors: Kenya Nakai, Tokyo (JP); Masayuki Ohmaki, Tokyo (JP); Nobuo Takeshita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/258,538

(22) PCT Filed: May 21, 2010

(86) PCT No.: PCT/JP2010/003430
§ 371 (c)(1),
(2), (4) Date: Sep. 22, 2011

(87) PCT Pub. No.: WO2010/137270
PCT Pub. Date: Dec. 2, 2010

(65) Prior Publication Data
US 2012/0014237 A1    Jan. 19, 2012

(30) Foreign Application Priority Data
May 25, 2009  (JP) ................. 2009-125177

(51) Int. Cl.
*G11B 7/00*   (2006.01)

(52) U.S. Cl. .................................... 369/44.41

(58) Field of Classification Search .......... None
See application file for complete search history.

(56) References Cited

U.S. PATENT DOCUMENTS

| | | | |
|---|---|---|---|
| 6,785,209 B2 * | 8/2004 | Chung et al. | 369/53.19 |
| 7,830,766 B2 * | 11/2010 | Kasahara | 369/59.22 |
| 2008/0159103 A1 | 7/2008 | Minemura et al. | |

FOREIGN PATENT DOCUMENTS

| | | |
|---|---|---|
| JP | 2004-079067 A | 3/2004 |
| JP | 2008-165925 A | 7/2008 |
| JP | 2008-243340 A | 10/2008 |
| JP | 2008-282485 A | 11/2008 |

OTHER PUBLICATIONS

Fuji et al. "Observation of Eye Pattern on Super-Resolution Near-Field Structure Disk with Write-Strategy Technique", Japanese Journal of Applied Physics, vol. 43, No. 7A, Jul. 7, 2004, pp. 4212-4215.
Kikukawa et al., "Low Frequency Noise Reduction of Super-Resolution Near-Field Structure Disc with Platinum-Oxide Layer", ODS Technical Digest, ThC3, 2005.
Shintani et al., "Sub-Terabyte-Data-Capacity Optical Discs Realized by Three-Dimensional Pit Selection", Japanese Journal of Applied Physics, vol. 45, No. 4A, Apr. 7, 2006, pp. 2593-2597.

* cited by examiner

*Primary Examiner* — Joseph Feild
*Assistant Examiner* — Parul Gupta
(74) *Attorney, Agent, or Firm* — Birch, Stewart, Kolasch & Birch, LLP

(57) ABSTRACT

A first signal is detected from the central part of a light beam returning from a super-resolution optical disc; a second signal is detected from a peripheral part in a direction corresponding to a track on the super-resolution optical disc; a gain adjustment unit is provided to adjust the amplitude of the first signal; a subtraction unit is provided to generate a third signal by subtracting, from the second signal, the first signal with the amplitude adjusted by the gain adjustment unit; and an unit is provided to generate a reproduced signal by combining the first signal and a signal obtained by delaying the third signal.

6 Claims, 6 Drawing Sheets

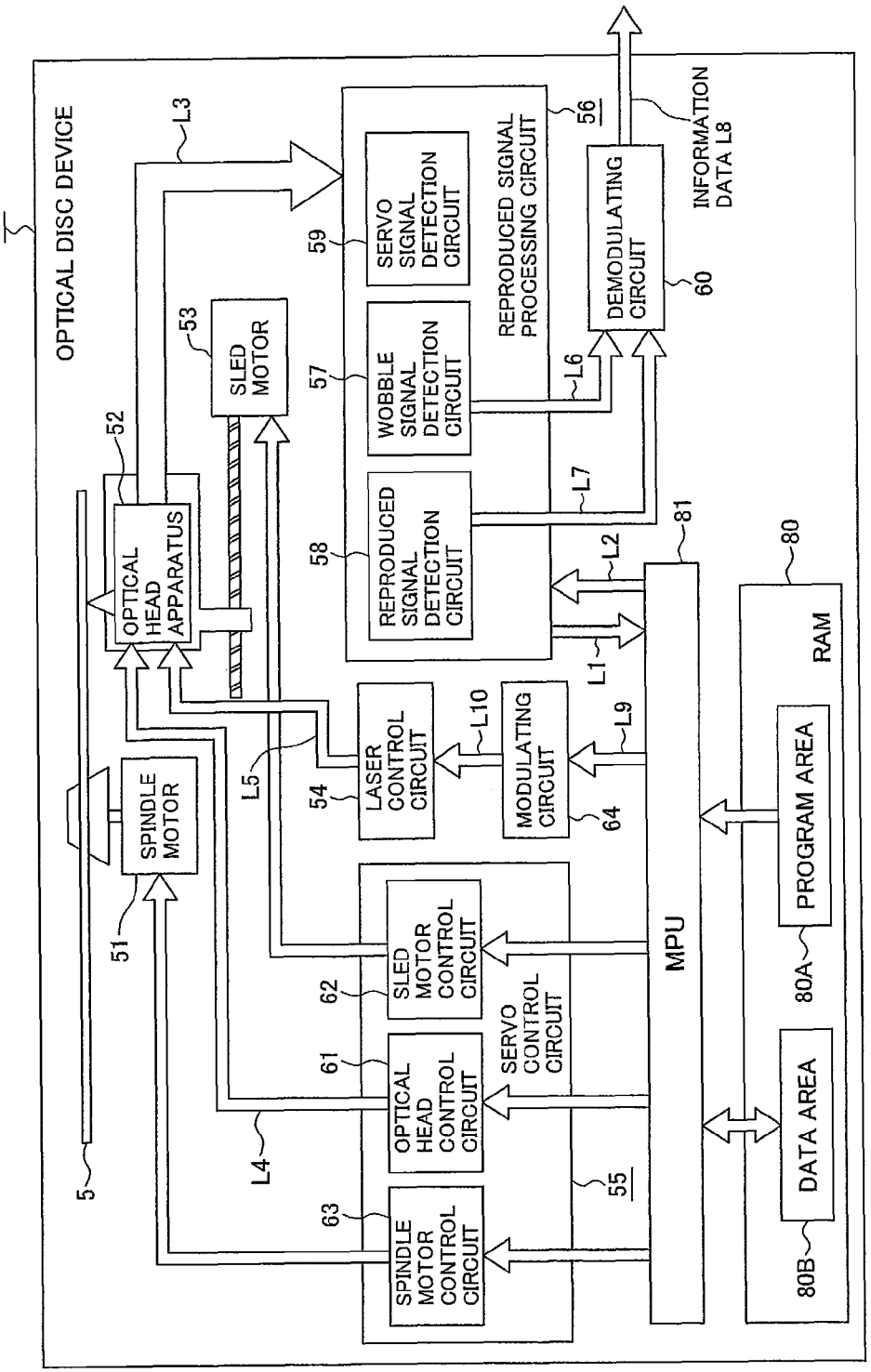

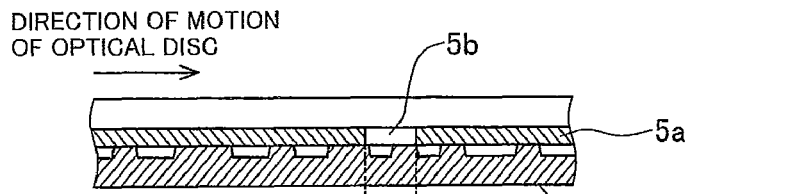
FIG.2(a)
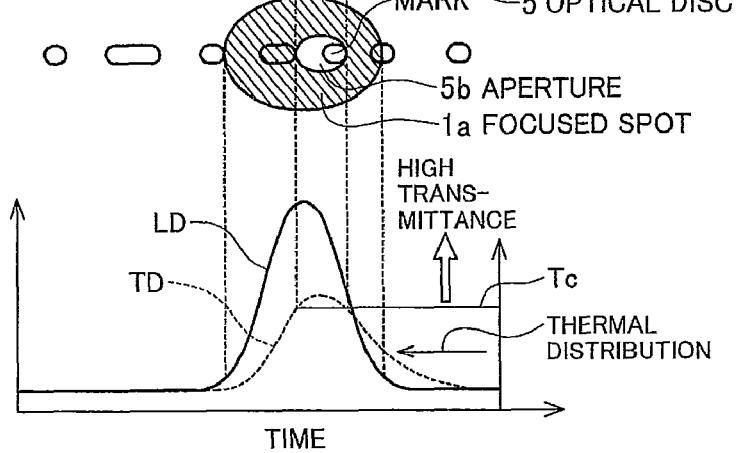
FIG.2(b)
FIG.2(c)
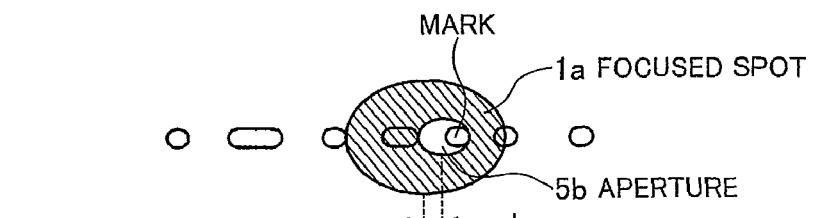
FIG.3(a)
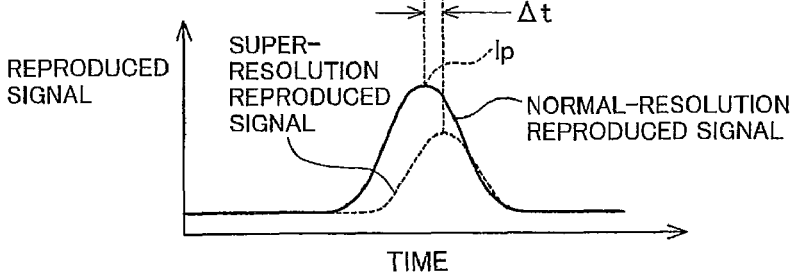
FIG.3(b)

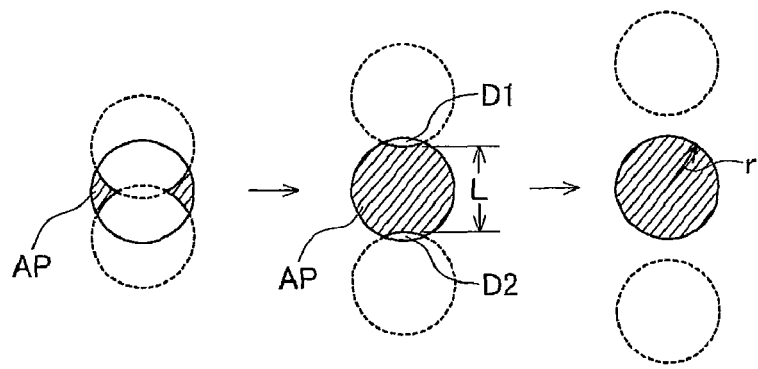
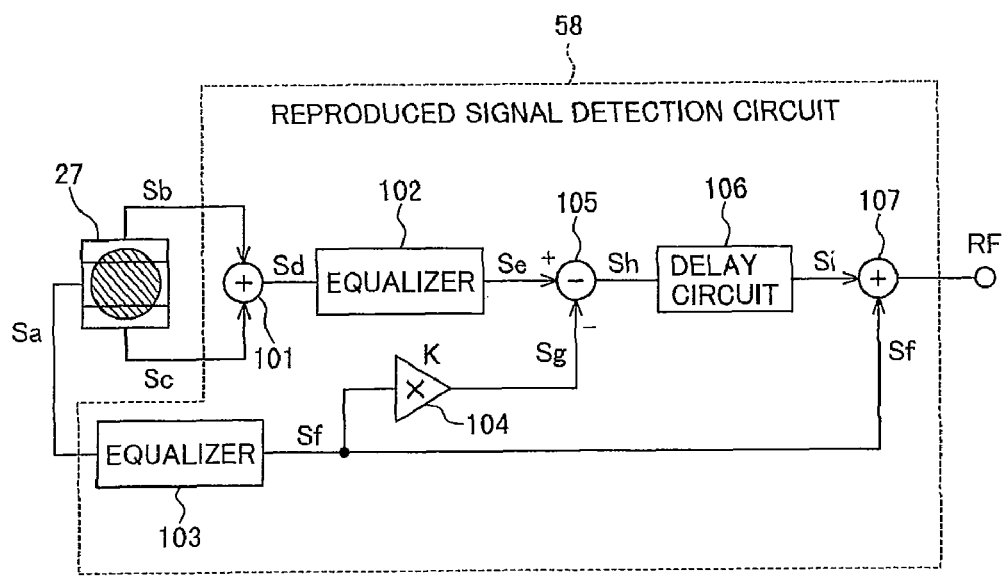

OPTICAL DISC DEVICE

FIELD OF THE INVENTION

The present invention relates to an optical disc device that records or reproduces information on an optical recording/reproducing medium by use of super resolution.

BACKGROUND ART

The increases that have taken place in the capacity of various types of optical discs have been achieved by reducing the size of the recorded marks by which information is recorded on the tracks on the disc, and by reducing the focused spot size on the focal plane by using laser light of shorter wavelengths for recording or reproducing, and objective lenses of larger numerical aperture.

For example, the CD (compact disc), with a disc substrate functioning as a light transmitting layer substantially 1.2 mm thick (including a transparent protective layer disposed on the information recording layer and a spacer layer; also referred to as a transparent substrate), a laser beam wavelength of substantially 780 nm, and an objective lens with a 0.45 numerical aperture (NA), had a capacity of 650 MB.

The DVD (digital versatile disc), with a light transmitting layer substantially 0.6 mm thick, a laser beam wavelength of substantially 650 nm, and a 0.6 NA, had a capacity of 4.7 GB.

The higher density BD (Blu-ray disc), using an optical disc with a light transmitting layer substantially 0.1 mm thick, a laser beam wavelength of substantially 405 nm, and a 0.85 NA, has achieved the large capacity of 25 GB per layer.

High density recording systems that use super-resolution optical discs have recently been under study in the optical recording field; in a super-resolution optical disc, a super-resolution mask layer having a nonlinear light absorbance characteristic or nonlinear light transmittance characteristic in which the refractive index changes with the light intensity is formed. These systems can reproduce marks smaller than the $\lambda/(4NA)$ diffraction limit determined by the wavelength $\lambda$ of the light and the numerical aperture NA of the focusing lens, which is an optical element of the optical disc device, by causing a change in refractive index in a localized area of high light intensity or high temperature in the focused spot on the optical disc. The localized area in which, for example, the change in refractive index occurs will be referred to simply as the aperture below (see, for example non-patent document 1).

Non-patent documents 1 and 2 concern a typical super-resolution optical disc of the Super-RENS (Super REsolution Nearfield Structure) type. Super-resolution optical discs in which the recorded marks of information are formed by a material having a nonlinear light absorbance characteristic or nonlinear light transmittance characteristic such that the refractive index changes with the light intensity have also been proposed (see, for example, non-patent document 3). The term super-resolution optical disc will be used below to refer to all of these.

PRIOR ART REFERENCES

Non-Patent Documents

Non-patent document 1: "Observation of Eye Pattern on Super-Resolution Near-Field Structure Disk with Write-Strategy Technique", Jpn. J. Appl. Phys., Vol. 43, No. 7A, pp. 4212-4215 (2004)

Non-patent document 2: "Low Frequency Noise Reduction of Super-Resolution Near-Field Structure Disc with Platinum-Oxide Layer", ODS Technical Digest, ThC3 (2005)

Non-patent document 3: "Sub-Terabyte-Data-Capacity Optical Discs Realized by Three-Dimensional Pit Selection", Jpn. J. Appl. Phys., Vol. 45, No. 4A, pp. 2593-2597 (2006)

SUMMARY OF THE INVENTION

Problem to be Solved by the Invention

The diffraction limit, which is the limit at which the reproduced marks cannot be resolved, corresponds to $\lambda/(4NA)$, being determined by the wavelength $\lambda$ of the light and the numerical aperture NA of the focusing lens, which is an optical element of the optical disc device, as noted above. Here the reproduced signal (component) obtained from marks smaller than the diffraction limit $\lambda/(4NA)$ will be referred to as the super-resolution reproduced signal (component), and the reproduced signal (component) obtained from marks larger than the diffraction limit $\lambda/(4NA)$ will be referred to as the normal-resolution reproduced signal (component).

Normally, data with a plurality of mark lengths are recorded on an optical disc. The mark lengths depend on the modulation scheme used for encoding the recorded data strings, and marks with different lengths are disposed randomly (in various sequences) on the disc.

When all mark lengths are greater than the $\lambda/(4NA)$ diffraction limit, each mark is reproduced at normal resolution.

With a BD, for example, a wavelength A of 405 nm and an objective lens with a numerical aperture NA of 0.85 are used, the diffraction limit $\lambda/(4NA)$ of the mark length is substantially 119 nm, and the shortest BD mark length is substantially 150 nm, so all marks are reproduced at normal resolution.

When all mark lengths are shorter than the $\lambda/(4NA)$ diffraction limit, each mark is reproduced at super resolution by the aperture in the focused spot.

In some cases, some marks are longer and other marks are shorter than the $\lambda/(4NA)$ diffraction limit (in which cases super resolution reproduction coexists with normal resolution reproduction).

On a disc of 50-GB capacity being studied using a super-resolution system with the same RLL (1, 7) modulation scheme as used on a BD, for example, the length of the shortest mark (a 2T mark) is substantially 75 nm, one-half the shortest mark length on a BD and shorter than the 119 nm diffraction limit, but the length of an 8T mark is 300 nm, longer than the 119 nm diffraction limit, so the reproduced signal includes modulated components reproduced at both super resolution and normal resolution.

A problem that occurs when super-resolution reproduction coexists with normal-resolution reproduction is phase misalignment between the super-resolution reproduced signal component and the normal-resolution reproduced signal component. The cause of this problem is that the above aperture is not formed in the center of the focused spot.

This invention provides an optical disc device that, when super-resolution reproduction coexists with normal-resolution reproduction, generates a reproduced signal by processing the super-resolution reproduced component and normal-resolution reproduced component separately, and can reproduce data of good quality from a super-resolution disc.

Means for Solving the Problem

An optical disc device according to the invention is an optical disc device comprising:

an optical head apparatus that detects a first signal detected from a central part of a returning light beam from a super-resolution optical disc and a second signal detected from a peripheral part of the returning light beam, the peripheral part being peripheral in a direction corresponding to a track direction on the super-resolution optical disc; and a signal processing means for generating a reproduced signal by operating on the first signal and the second signal in combination or separately;

wherein the signal processing means adjusts a phase difference between the first signal and the second signal.

Effect of the Invention

According to the present invention, even when super-resolution reproduction coexists with normal-resolution reproduction, the signal degradation caused by the shift in signal phase that occurs between normal-resolution reproduction and super-resolution reproduction can be mitigated and data of good quality can be reproduced from the super-resolution disc.

BRIEF DESCRIPTION OF THE DRAWINGS

FIG. 1 is a schematic depiction of the overall configuration of an optical disc device in a first embodiment of the invention.

FIGS. 2(a) to 2(c) illustrate the positional relationship of the focused light spot and the aperture in the super-resolution mask layer of the super-resolution optical disc, and the positional relationships of the light intensity distribution and thermal distribution.

FIGS. 3(a) and 3(b) illustrate the relationships of the super-resolution reproduced signal, the normal-resolution reproduced signal, and the aperture.

FIGS. 6(a) to 6(c) illustrate the interference region of the returning light beam in relation to the lengths of marks on the optical disc.

FIG. 7 is a block diagram schematically showing the optical head apparatus 52 and an example of the configuration of the reproduced signal detection circuit 58 in the optical disc device in FIG. 1.

MODE FOR CARRYING OUT THE INVENTION

First Embodiment

Figure 4:
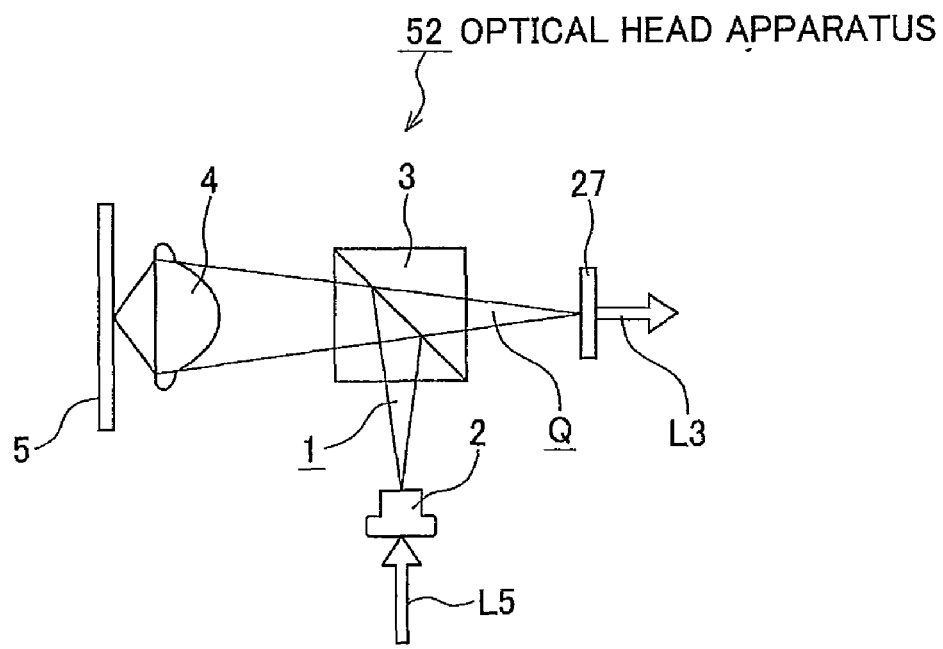
FIG. 4 is a schematic structural drawing of the optical head apparatus mounted in the optical disc device in the first embodiment of the invention.

FIG. 1 shows the overall configuration of an optical disc device in a first embodiment. The arrows in FIG. 1 indicate the flow of representative signals and information; they do not represent all of the interconnection relationships between the blocks constituting the optical disc device 50. Signals and information will sometimes be designated by the same reference characters as the paths on which they are carried.

The optical disc device 50 in FIG. 1 has a spindle motor 51 for rotationally driving an optical disc 5, an optical head apparatus 52 that illuminates the optical disc 5 with laser light, receives the returning light beam reflected from the information recording layer of the optical disc 5, and outputs signals, a sled motor 53 for driving the optical head apparatus 52 in the radial direction of the optical disc 5, a laser control circuit 54, a servo control circuit 55, a reproduced signal processing circuit 56, a demodulating circuit 60, a modulating circuit 64, a RAM (Random Access Memory) 80, and an MPU (Micro Processing Unit) 81.

The servo control circuit 55 is provided with a spindle motor control circuit 63 for controlling the spindle motor 51, a sled motor control circuit 62 for controlling the sled motor 53 and an optical head control circuit 61 for controlling the optical head apparatus 52, each circuit operating in response to commands from the MPU 81.

The reproduced signal processing circuit 56 includes a servo signal detection circuit 59 for generating servo signals based on signals detected by the optical head apparatus 52 and sent on transmission path L3, a reproduced signal detection circuit 58 for detecting the reproduced signal RF and equalizing its waveform, and a wobble signal detection circuit 57 for detecting wobble signals obtained from light reflected from a serpentine guide track groove on the optical disc 5.

For ROM (Read Only Memory) discs which have no guide track groove, the wobble signal detection circuit 57 may be omitted.

The MPU 81 determines the operation of the entire optical disc device on the basis of signals such as signal amplitude data and status signals detected by the reproduced signal processing circuit 56 and output on transmission path L1, or signals output from other components, and sends control data to control those components (for example, signals are sent from the MPU 81 to the reproduced signal processing circuit 56 on transmission path L2).

Alternatively, some components of the reproduced signal processing circuit 56 may operate inside the MPU 81.

The RAM 80 has a program area 80A and a data area 80B. The MPU 81 controls the components according to programs recorded in the program area 80A of the RAM 80, and determines what control to perform from the signals sent from the components.

On the basis of the servo error signals sent from the servo signal detection circuit 59 and operating commands from the MPU 81, the optical head control circuit 61 outputs control signals to the optical head apparatus 52 via transmission path L4 to control the light directed from the optical head apparatus 52 onto the optical disc 5.

On the basis of servo error signals and operating commands from the MPU 81, the sled motor control circuit 62 and the spindle motor control circuit 63 control the spindle motor 51 and the sled motor 53.

The output signal L6 from the wobble signal detection circuit 57 and the output signal L7 from the reproduced signal detection circuit 58 are demodulated into information data L8 in the demodulating circuit 60.

One part L9 of the data output from the MPU 81 is converted to a recording signal L10 adapted for recording on the optical disc 5 by the modulating circuit 64 and the signal L10 is sent to the laser control circuit 54. On the basis of the recording signal L10, a control signal is sent from the laser control circuit 54 to the optical head apparatus 52 via transmission path L5 to control the emission power of the semiconductor laser mounted in the optical head apparatus 52.

For ROM (Read Only Memory) discs, the laser control circuit 54, which is used for recording, may be omitted.

As shown in FIGS. 2(a) to 2(c) and FIGS. 3(a) and 3(b), the optical disc 5 in the first embodiment is a super-resolution optical disc on which a super-resolution mask layer 5a having a light absorbance characteristic or light transmittance characteristic that is nonlinear with respect to light intensity is formed. Next, the problems in the prior art will be described in further detail with reference to FIGS. 2(a) to 2(c) and 3(a) and 3(b).

For simplicity, the illustrated disc structure shows a minimal configuration; there may be other layers made from different materials as well.

Other disc structures such as a proposed super-resolution disc in which the marks themselves are made from a material having a nonlinear light absorbance characteristic are applicable as well (for example, non-patent document 3).

As shown in FIGS. 2(a) to 2(c), the light intensity distribution LD of a focused spot 1a focused by an ordinary isotropic lens is a Gaussian distribution, so the position of the light intensity peak lies in the center of the focused spot 1a, but during reproduction, the optical disc is spinning and its rotational velocity is of an order close to the heat conduction velocity, so as shown in FIG. 2(b), the thermal distribution TD lags the light intensity distribution LD of the focused spot. Since the aperture 5b of the super-resolution mask layer 5a is formed by a change in transmittance (or refractive index) occurring at and above a certain temperature Tc (or in a certain range of temperatures (not shown)) in the thermal distribution, the center of the aperture 5b is formed at a position that lags the peak 1p of the intensity distribution LD of the focused spot 1a.

In this example, transmittance (or refractive index) changes at and above temperature Tc, but the aperture in a super-resolution disc may be formed by a change in transmittance (or refractive index) that occurs within a certain temperature range.

For the above reason, the aperture 5b is formed at a position where its center is displaced by a distance d from the center of the focused spot 1a in the direction of travel of the disc. This configuration poses a problem in that signals with different phases coexist, because the super-resolution reproduced signal (component) detected at the aperture 5b temporally lags the normal-resolution reproduced signal (component) detected in the entire focused spot 1a by $\Delta t$ (=d/rotational linear velocity). The present invention solves this problem and can mitigate the signal degradation caused by the signal phase shift between normal-resolution reproduction and super-resolution reproduction, even when both normal-resolution reproduction and super-resolution reproduction coexist, and can reproduce data with good quality from a super-resolution disc.

The optical head apparatus 52 is operable not only with non-super-resolution optical discs such as CDs, DVDs, and BDs but also with super-resolution optical discs.

The optical head apparatus 52 focuses the light beam from the semiconductor laser onto the optical disc 5, receives a returning light beam reflected on the information recording layer of the optical disc 5, and detects signals used for generating the reproduced signal and servo signals.

FIG. 4 shows an example of the structure of the optical head apparatus 52. In FIG. 4, a light beam 1 with wavelength A emitted from the semiconductor laser 2 based on control signal input from the laser control circuit 54 via transmission path L5 is reflected in the beam splitter 3 and focused by the objective lens 4 onto the optical disc 5. The returning light beam Q reflected from the optical disc 5 passes through the beam splitter 3 and converges. This returning light beam Q is received by the light receiving surface of the light receiving device 27 and an electrical signal corresponding to the received light power is output on transmission path L3.

The structure of the optical head apparatus is not limited to the structure shown in FIG. 4; the purpose of FIG. 4 is to illustrate the basic structure and principles of the optical head apparatus in the invention; it only shows the minimal component configuration of the optical system for detecting a reproduced signal from the optical disc.

For example, an objective lens driving actuator may additionally be provided to drive the objective lens 4 in the direction of the optical axis or in the direction perpendicular to the optical axis, in order to adjust error in the focal length of the objective lens 4 caused by a shift in the position of the optical disc 5 in the direction of the optical axis of the objective lens 4 or in the direction perpendicular to the optical axis during rotation of the optical disc 5.

Alternatively, in addition to an optical system for detecting the signal reproduced from the optical disc, a sensor optical system may additionally be provided that detects focus error or tracking error of the objective lens 4 relative to the information recording layer of the optical disc 5.

Alternatively, a polarizing beam splitter may be provided instead of the beam splitter 3 shown in the figure, and a ¼ wave plate may be provided between the polarizing beam splitter and the objective lens 4. This configuration allows for more efficient use of light.

Figure 5:
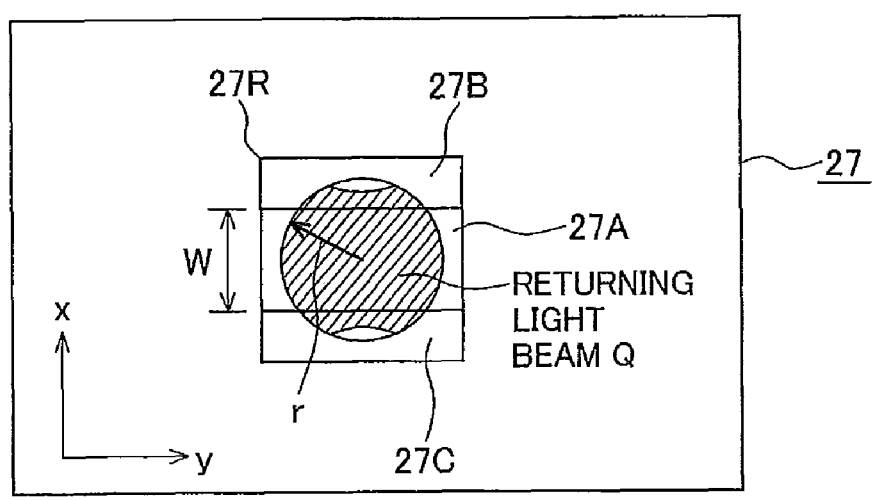
FIG. 5 schematically shows the light-receiving surface of the light-receiving device mounted in the optical head apparatus in FIG. 4 and the returning light beam.

FIG. 5 shows the light receiving surface 27R of the light receiving device 27 and the returning light beam Q. Reproduced signals can be obtained from the signal detected from the returning light beam Q received at the light receiving surface 27R as described below.

The light receiving surface 27R is divided into three light receiving elements: a central light receiving element 27A and a pair of light receiving elements 27B, 27C disposed adjacent to and in symmetric positions with respect to said light receiving element 27A. The x-axis (the vertical direction in FIG. 5) corresponds to the direction in which the track direction (the tangential direction) on the optical disc 5 is projected onto the light receiving surface via the optical elements.

If W is the width of light receiving element 27A in the x-axis direction and r is the radius of the returning light beam Q on the light receiving surface, the diameter 2r of the returning light beam is designed to be larger than width W. Next, in order to explain the setting of width W, the normal-resolution and super-resolution reproduced signals detected by the light receiving device of the optical head will be described.

Consider the case of normal-resolution reproduction. As shown in FIG. 6(a), the optical lightness-darkness variations arising from interference inside the returning light beam between the zero-order light and the higher-order light (first-order or higher) generated by diffraction at the mark become the modulated component of the reproduced signal. The interference regions between the zero-order and first-order light are indicated as D1 and D2 in FIGS. 6(a) to 6(c).

Region AP corresponds to the pupil of the objective lens; it is the light within this region that is actually received by the light receiving device. Among the higher-order light FIGS. 6(a) to 6(c) show only the first-order light, in the dashed lines. FIG. 6(a) in particular shows a case in which the mark length ML is longer than $\lambda/(2NA)$ and the first-order light spots overlap each other.

Taking the case of the returning light when the mark length ML is shorter than $\lambda/(2NA)$ and longer than $\lambda/(4NA)$, the interference regions D1 and D2 (interference regions between the zero-order and the first-order light) are separated from each other by a distance L, and are absent from the central part of the returning light, as in FIG. 6(b). The shorter the mark length is, the wider the distance L is.

In other words, as the mark length becomes shorter, the interference region shifts in the track direction (the direction corresponding to the track direction) toward the peripheral part of the returning light, so that the peripheral region contains more of the modulated component of the normal-resolution reproduced signal.

If the mark length becomes shorter than the diffraction limit $\lambda/(4NA)$, the distance L becomes larger than the radius r of the returning light, and there is no interference region D1 or D2 in the returning light. In other words, no normal-resolution reproduced signal component is present.

In the case of super-resolution reproduction, the modulated component of the mark read at the very small aperture 5b generated in the super-resolution mask layer 5a of the optical disc is present on the entire region of the returning light beam on the light-receiving surface of the light-receiving device, that is, the whole of the region AP in FIGS. 6(a) to 6(c) that corresponds to the pupil of the objective lens. This phenomenon has been confirmed in an optical simulation carried out by the inventors.

For the above reasons, in dividing the light receiving surface 27R, the width W of light receiving element 27A is determined such that the central part of the returning light beam is received by light receiving element 27A and the peripheral parts are received separately by light receiving elements 27B and 27C.

Since interference regions D1 and D2 are peripheral to the central part of the returning light beam, when the returning light beam Q is detected by the light receiving surface 27R in FIG. 5, the signal Sa output from light receiving element 27A is obtained as a super-resolution reproduced signal substantially free of normal-resolution reproduced signal components.

Furthermore, when the maximum mark length ML_max of the optical disc is greater than the diffraction limit $\lambda/(4NA)$, the distance L between the interference regions D1 and D2 can be expressed as $$2\times(\lambda/(2\times NA\times ML\_max)-1)\times r.$$

If the width W is set to about same value as the above-mentioned L, or a smaller value, the interference regions D1 and D2 fall entirely onto light receiving element 27B or 27C, so a signal Sa including only super-resolution reproduced signal components and completely free of normal resolution reproduced signal components is obtained.

Moreover, the condition for the existence of interference regions D1 and D2 is that the maximum mark length ML_max of the optical disc is greater than the diffraction limit $\lambda/(4NA)$, so the effect can be expected to occur on an optical disc which records data strings composed of marks such that the maximum mark length ML_max of the optical disc is greater than the diffraction limit $\lambda/(4NA)$ and less than $\lambda/(2NA)$.

The signals Sb and Sc output from light receiving elements 27B and 27C include both a normal-resolution reproduced signal component and a super-resolution reproduced signal component.

Thus a signal Sa including only a super-resolution reproduced signal component and signals Sb and Sc including both a normal-resolution reproduced signal component and a super-resolution reproduced signal component can be obtained by the above optical head apparatus 52.

FIG. 7 shows the schematic configuration of the reproduced signal detection circuit 58 in the reproduced signal processing circuit 56 that receives signals Sa, Sb, and Sc in the present invention. This drawing depicts the part of the reproduced signal detection circuit 58 that detects the reproduced signal RF.

Signals Sb and Sc are added by a summing circuit 101 to generate a signal Sd, and its gain and phase are appropriately adjusted by an equalizer 102 used as a gain and phase adjustment means to generate a signal Se. The gain and phase of signal Sa are appropriately adjusted by an equalizer 103 used as a gain and phase adjustment means to generate a signal Sf, which in turn is split into two portions. The amplitude of one of the split portions is adjusted by multiplying an appropriate gain K by a gain adjuster 104 to generate a signal Sg. Signal Sg is subtracted from signal Se by a subtraction circuit 105 to generate a signal Sh, which in turn is delayed by the delay circuit 106 to generate a signal Si, which is added to signal Sf by a summing circuit 107 to generate the reproduced signal RF.

The general concept of this reproduced signal generating system will be described with reference to FIGS. 8(a) to 8(d).

Figure 8A:
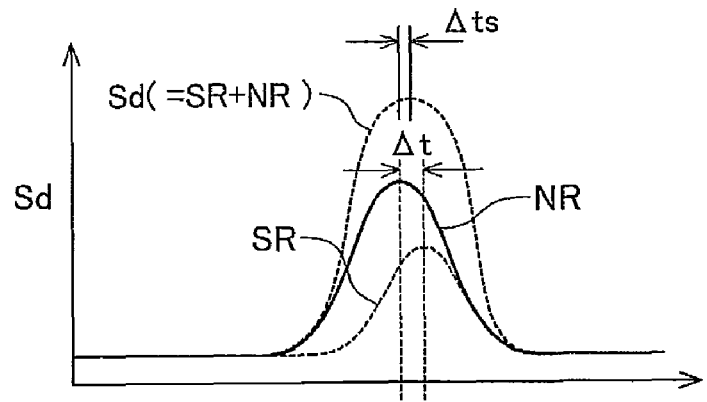
FIGS. 8(a) to 8(d) schematically show the waveforms of signals at various points in the optical head apparatus 52 and reproduced signal detection circuit 58 in FIG. 7.

FIGS. 8(a) to 8(d) schematically show the above signals Sa to Si when a mark with a certain length is reproduced. As explained with reference to FIGS. 2(a) to 2(c) and 3(a) and 3(b), since reproduction is carried out with a temporal shift of $\Delta t$ between the light intensity distribution and thermal distribution, when both the super-resolution reproduced signal component SR and the normal-resolution reproduced signal component NR coexist, there is a temporal shift of $\Delta t$ between the super-resolution signal component SR and the normal-resolution signal component NR included in signal Sd (the signal combining Sb and Sc), as shown in FIG. 8(a). Therefore, signal Sd is shifted from the normal-resolution reproduced signal component NR by a quantity $\Delta ts$ ($\Delta ts<\Delta t$), which is intermediate between zero and the temporal difference $\Delta t$ between the super-resolution reproduced signal component SR and the normal-resolution reproduced signal component NR.

Figure 8B:
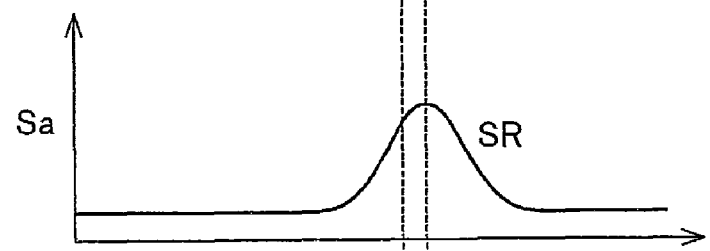

FIG. 8(b) shows the waveform of signal Sa; this waveform is identical to the super-resolution reproduced signal component SR in FIG. 8(a).

Figure 8C:
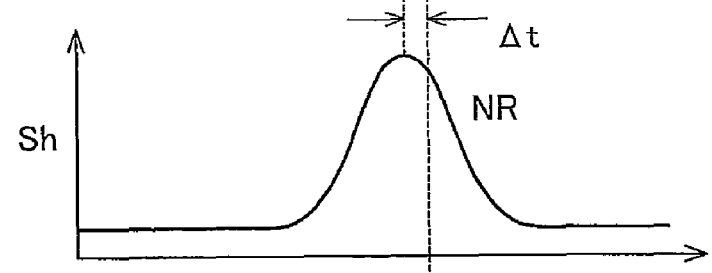

FIG. 8(c) shows the waveform of signal Sh; signal Sh is obtained by subtracting the super-resolution signal component SR from signal Se (having substantially the same phase as signal Sd) and represents the normal-resolution reproduced signal component NR.

Figure 8D:
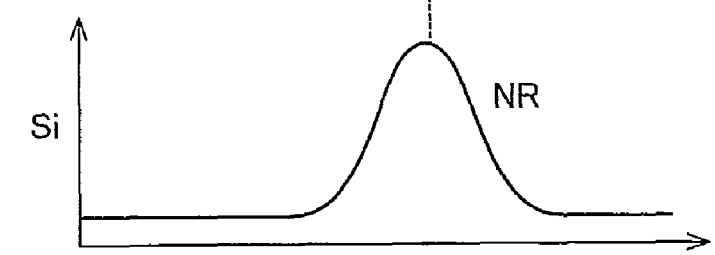

Since signal Sh is shifted from signal Sf (which has substantially same phase as signal Sa) by time $\Delta t$, the signal Si shown in FIG. 8(d) can be obtained by using the delay circuit 106 to adjust the phase of signal Sh by time $\Delta t$. By generating the reproduced signal RF in summing circuit 107 by combining signal Si, which is a normal-resolution signal with adjusted phase, and signal Sf, which is a super-resolution signal, the signal degradation caused by the phase difference between the super-resolution reproduced signal component and the normal-resolution reproduced signal component generated during reproduction of the super-resolution disc can be suppressed.

The above series of processes adjusts the phase difference between signals Sd and Sa by separating the normal-resolution reproduced signal component NR and the super-resolution reproduced signal component SR and adjusting the phase difference between these components.

Alternatively, the signals can be processed by adding a delay to either signal Sd or Sa, appropriately adjusting its amplitude, and then combining the signals to generate the reproduced signal RF.

Because the signal reproduced from the optical disc has a high frequency of from several megahertz to several tens of megahertz, it is difficult to configure the equalizers 102, 103, the delay circuit 106, the subtraction circuit 105 used for the signal combination, and the summing circuits 101, 107 in FIG. 7, from analog circuits; each of them is more easily configured by use of a digital circuit such as a FIR (Finite Impulse Response) circuit. Gain and phase or delay can be imparted by setting the tap coefficients of the FIR circuit to appropriate values.

Figure 9:
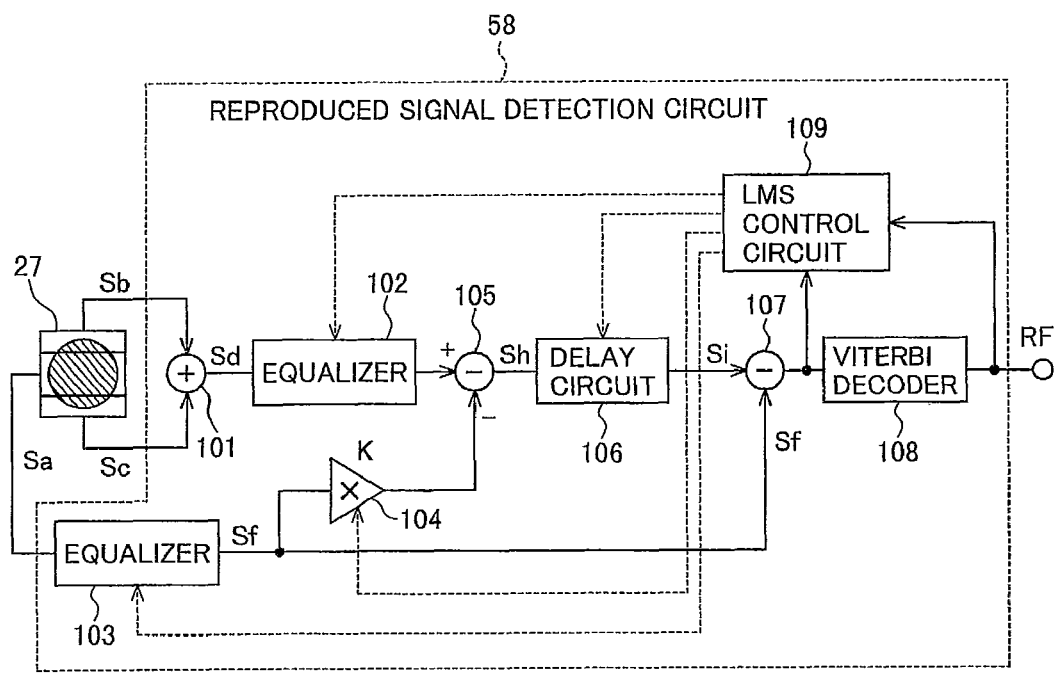
FIG. 9 is a block diagram schematically showing the optical head apparatus 52 and another example of the configuration of the reproduced signal detection circuit 58 in the optical disc device in FIG. 1.

FIG. 9 shows a reproduced signal detection circuit 58 that may be used instead of the reproduced signal detection circuit 58 in FIG. 7. The reproduced signal detection circuit 58 shown in FIG. 9 has FIR circuits with variable tap coefficients which constitute the equalizers 102, 103, the delay circuit 106, and the gain adjuster 104 of gain K, optimizes the gain, phase, and delay, and automatically equalizes the reproduced signal RF, using the Viterbi demodulation method with binarized data; FIG. 9 shows the basic concept of this signal processing.

An adaptive signal processing method such as the LMS (Least Mean Square) method is used to update the tap coefficients.

The reproduced signal RF is decoded to binary data BRF by a Viterbi decoder 108 functioning as a binarizing means. For Viterbi decoding, a PR class close to the ideal frequency characteristic of the reproduced signal is selected, and the binarized data BFR output from the Viterbi decoder 108 are input to an LMS control circuit 109 serving as an adaptive equalization means. The LMS control circuit 109 sequentially updates the tap coefficients of the FIR circuits to minimize the error between the target signal represented by the PR class and the reproduced signal RF, and adaptively alters the gain of the gain adjuster 104 and the delay of the delay circuit 106, based on the output of the Viterbi decoder 108, for example, to equalize the waveform of reproduced signal RF.

In the circuit configuration in FIG. 9, the tap coefficients are updated by the LMS method for all components of the equalizers 102, 103, the gain adjuster 104, and the delay circuit 106, but if the waveform equalization of the reproduced signal RF has sufficient convergence, the circuit size can be reduced by giving the tap coefficients for the gain adjuster 104 and delay circuit 106 fixed values instead of sequentially updating them by the LMS method.

The A/D converter that converts the analog signals from the optical head apparatus to digital signals, the PLL (Phase Locked Loop) circuit that generates operating clocks for the digital circuits, and the DC adjustment circuit that adjusts the DC component of the signals binarized in the AD converter are not described above, because they are not characteristic features of the present invention.

Figure 10:
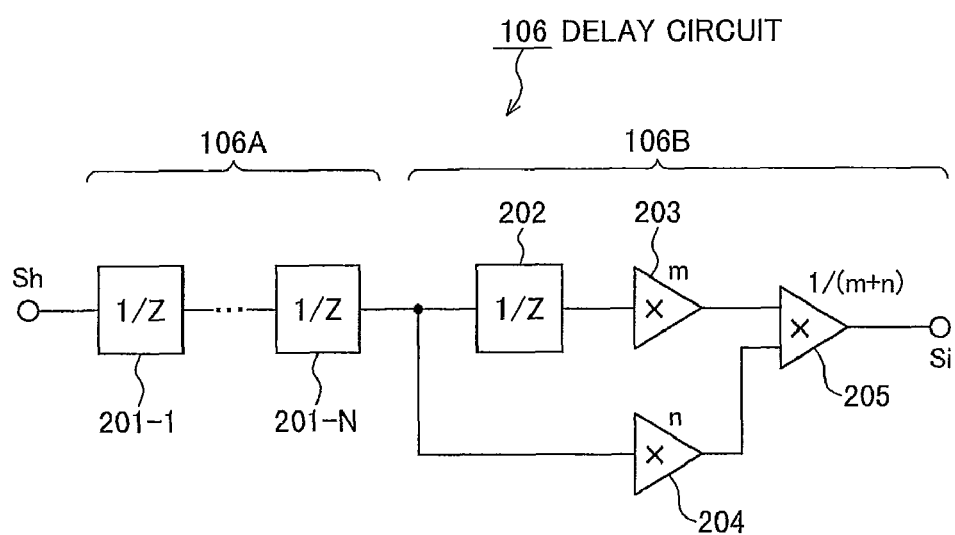
FIG. 10 is a block diagram schematically showing an example of the configuration of the delay circuit 106 in the reproduced signal detection circuit 58 in FIGS. 7 and 9.

FIG. 10 is a block diagram showing an exemplary delay circuit 106 configured from digital circuits. A feature of this configuration is that it can impart a delay of one clock period or less, but the configuration is not limited to the illustrated one.

The illustrated delay circuit 106 includes a first part 106A, the purpose of which is to impart a comparatively large delay of N clock periods, and a second part 106B, the purpose of which is to impart a delay of 1 clock period or less. Although the first part constitutes the first stage and the second part constitutes the second stage in the drawing, a configuration in which the first part constitutes the second stage and the second part constitutes the first stage is also possible.

The first part 106A is a digital circuit comprising a connected series of first to N-th delay units 201-1 to 201-N of the ordinary type each having a delay time of one clock period. The output from the first part 106A is input to the second part 106B and split into two portions, one of which is delayed by delay unit 202 by one clock and given a gain of m by a gain adjuster 203, the other of which is given a gain of n by a gain adjuster 204 with no delay introduced. These two portions are combined and multiplied by 1/(m+n) by a combiner 205.

If the above gains m and n are appropriately selected, a waveform can be obtained by linear interpolation of the signal value at each clock timing with the value of the signal at an arbitrary point within the preceding clock period (a point dividing the period in the ratio of m:n). This process can produce an arbitrary delay within one clock period.

The above N, m and n are determined based on the delay necessary for waveform equalization. In a configuration using the LMS scheme described with reference to FIG. 9, N, m, and n are controlled by the LMS control circuit 109.

As described above, the configuration of the first embodiment of the invention has the effect of improving the quality of the reproduced signal by separating the super-resolution signal component and normal-resolution signal component included in the signal reproduced from a super-resolution disc to suppress degradation of the reproduced signal caused by the temporal phase difference between normal-resolution reproduction and super-resolution reproduction, without loss of light in the returning light beam.

REFERENCE CHARACTERS

1 light beam, 2 semiconductor laser, 4 objective lens, 5 optical disc, 27 light-receiving device, 50 optical disc device, 52 optical head apparatus, Q returning light beam, Sa-Si signals, 101, 107 summing circuits, 105 subtracting circuit, 102, 103 equalizers, 106 delay circuit, RF reproduced signal.

What is claimed is:

1. An optical disc device comprising:
   an optical head apparatus that detects a first signal detected from a central part of a returning light beam from a super-resolution optical disc and a second signal detected from a peripheral part of the returning light beam, the peripheral part being peripheral in a direction corresponding to a track direction on the super-resolution optical disc; and
   a signal processing unit configured to generate a reproduced signal by operating on the first signal and the second signal in combination or separately;
   wherein the signal processing unit comprises:
   a gain adjustment unit configured to adjust an amplitude of the first signal;
   a subtraction unit configured to generate a third signal by subtracting, from the second signal, the first signal with the amplitude adjusted by the gain adjustment unit; and
   a delay unit configured to generate a fourth signal by correcting a delay between the third signal and the first signal; and wherein
   the signal processing unit generates the reproduced signal by combining the first signal with the fourth signal output from the delay unit.

2. The optical disc device of claim 1, wherein the super-resolution optical disc has an additional super-resolution mask layer having a light absorbance characteristic or light transmittance characteristic nonlinear with respect to light intensity.

3. The optical disc device of claim 1, further comprising:
a first gain and phase adjustment unit configured to adjust a gain and phase of the first signal; and
a second gain and phase adjustment unit configured to adjust a gain and phase of the second signal; wherein
the gain adjustment unit adjusts the amplitude of the first signal after adjustment of the gain and phase of the first signal by the first gain and phase adjustment unit;
the subtraction unit subtracts the first signal with the amplitude adjusted by the gain adjustment unit from the second signal after adjustment of the gain and phase of the second signal by the second gain and phase adjustment unit.

4. The optical disc device of claim 3, also comprising a binarizing unit configured to binarize the reproduced signal to read digital information recorded on the optical disc, wherein:
the first gain and phase adjustment unit and the second gain and phase adjustment unit comprise FIR circuits; and
the binarizing unit is a Viterbi decoder; and
further comprising an adaptive equalizing unit configured to perform waveform equalization processing on the reproduced signal while adaptively varying tap coefficients of the FIR circuits in the first gain and phase adjustment unit and the second gain and phase adjustment unit, a gain value of the gain adjustment unit, and a delay amount of the delay unit, responsive to an output of the Viterbi decoder.

5. The optical disc device of claim 1, wherein the optical head apparatus comprises:
a semiconductor laser;
an objective lens for focusing a light beam emitted from the semiconductor laser to form a focused spot on the optical disc; and
a light-receiving device having a light receiving surface divided into a plurality of parts, for receiving the returning light beam, the returning light beam being a reflection of the focused spot from the optical disc, and converting amounts of light in the returning light beam received on the light receiving surface to electrical signals; and wherein:
the light receiving surface of the light-receiving device has a first light receiving element for receiving the central part of the returning light beam and outputting the first signal, and a second light receiving element for receiving the peripheral part of the returning light beam, the peripheral part being peripheral in the direction corresponding to the track on the optical disc, and outputting the second signal; and
a width W of the first light receiving element in the direction corresponding to the track on the optical disc is equal to or less than a length expressed using a wavelength $\lambda$ of the light beam, a maximum mark length ML_max of the super-resolution optical disc, a numerical aperture NA of the objective lens and a radius r of the returning light beam on the light receiving surface as $$2\times(\lambda/(2\times NA\times ML\_max)-1)\times r.$$

6. The optical disc device of claim 1, wherein the maximum mark length ML_max of the super-resolution optical disc is less than $\lambda/(2NA)$ and greater than $\lambda/(4NA)$, where $\lambda$ denotes a wavelength of the light beam, and NA denotes a numerical aperture of the objective lens.

* * * * *